Figure 1:
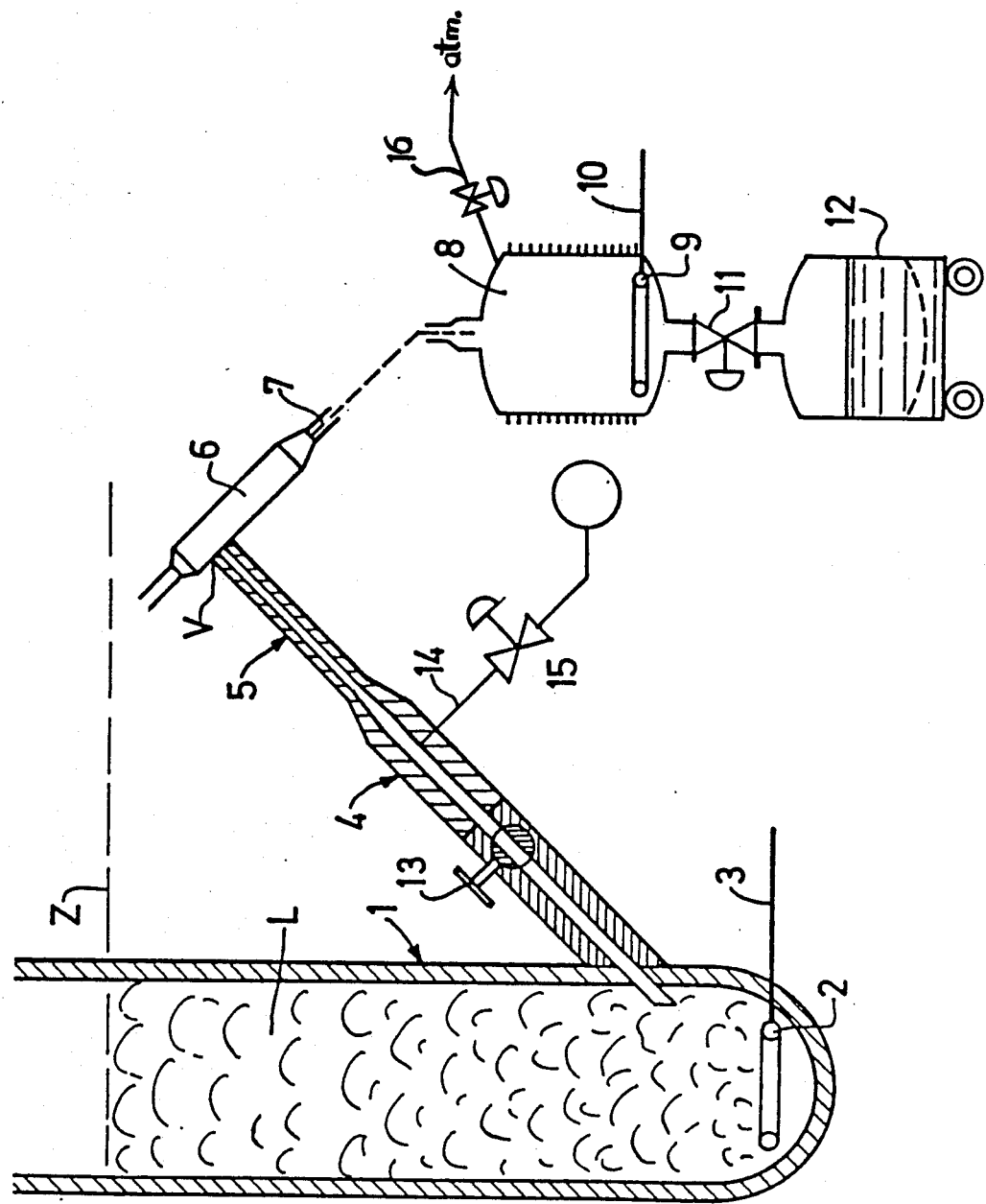

United States Patent [19]

Mauleon et al.

[11] Patent Number: 4,854,180

[45] Date of Patent: Aug. 8, 1989

[54] SYSTEM FOR THE SAMPLING IN AN ENCLOSURE OF SOLID PARTICLES IN A FLUIDIZED BED

[75] Inventors: Jean-Louis Mauleon, Merly-Le-Roi; Francois Ville, Paris; Charles Mengus, Grisheim-Souffel, all of France

[73] Assignee: Compagnie De Raffinage et de Distribution Total France, Levallois-Perret, France

[21] Appl. No.: 261,038

[22] Filed: Oct. 21, 1988

[30] Foreign Application Priority Data

Oct. 21, 1987 [FR] France .............. 87 14538

[51] Int. Cl.$^4$ .............................................. G10N 1/00
[52] U.S. Cl. .................................................. 73/863.86
[58] Field of Search ........... 73/863.81, 863.83, 863.86, 73/864.33

[56] References Cited

U.S. PATENT DOCUMENTS

| | | | |
|---|---|---|---|
| 3,786,682 | 1/1974 | Winter et al. ........................ | 73/421 |
| 3,994,824 | 11/1976 | White et al. ........................ | 422/145 |
| 4,009,618 | 3/1977 | Chatham ............................... | 73/424 |
| 4,106,210 | 8/1978 | Jukkola ................................ | 34/10 |
| 4,327,055 | 4/1982 | Luckenbach et al. ............. | 422/110 |
| 4,430,300 | 2/1984 | Vickers ................................ | 422/109 |
| 4,682,506 | 7/1987 | Wienck et al. ..................... | 73/863.54 |
| 4,708,785 | 11/1987 | Myens .................................. | 208/113 |

FOREIGN PATENT DOCUMENTS

| | | |
|---|---|---|
| 0032064 | 12/1980 | European Pat. Off. . |
| 2800268 | 7/1978 | Fed. Rep. of Germany . |
| 2257329 | 8/1975 | France . |
| 2317642 | 2/1977 | France . |

Primary Examiner—Michael J. Tokar
Assistant Examiner—Michele Simons
Attorney, Agent, or Firm—A. Thomas S. Safford

[57] ABSTRACT

The invention relates to a sampling method and apparatus for a fluidized bed of particles in an enclosure, comprising a sampling riser pipe (4) that communicates with the enclosure (1) below the upper surface of the fluidized bed and forms an extension thereof and has a restriction (5) adapted to limit the sampling flow rate, and means (14, 15) provided for injecting a compressed gas at an adjustable flow rate into the pipe (4) between the enclosure (1) and the restriction (5) with a view to controlling, by appropriate regulation of the flow rate of the gas, the quantity of particles withdrawn.

11 Claims, 1 Drawing Sheet

SYSTEM FOR THE SAMPLING IN AN ENCLOSURE OF SOLID PARTICLES IN A FLUIDIZED BED

The present invention relates to a system for the sampling in a pressurized enclosure of solid particles in a fluidized bed in a gas stream.

As is known, fluidization, that is, the maintaining of a solid in a finely divided state in suspension in a gas, has a great many industrial applications. (See the book by Roger Dumon, "Les Applications Industrielles des Lits Fluidises" [Industrial applications of fluidized beds], Edition Masson, 1981.) These applications include, in particular, the continuous cracking of hydrocarbons in the presence of catalyst particles in a fluidized bed, with regeneration of the spent catalyst and recycling of the regenerated catalyst to the cracking reactor. Reference may be had, for example, to French patent application No. 2,576,906, filed in the name of the applicant's assignee.

It is known that there are several types of fluidized beds, which differ from one another by the nature of the fluids and particles involved and by the velocity of the fluids used. Thus there are dense beds, expanded beds, moving or ebullating beds, circulating dilute-phase fluidized beds, etc. (See the aforesaid book by Roger Dumon.)

The fluidized beds to which the present invention is addressed are mobile or ebullating beds, which are highly abrasive since the particles are continually in motion.

With respect to some properties, fluidized beds resemble liquids, particularly so far as their apparent specific gravity, their apparent viscosity, their pressure drop and the pressure which they exert on the walls of an enclosure are concerned. For example, in a U-shaped reactor provided at its base with a diffuser, the upper surface of the fluidized bed will be the same in each leg of the U. Such fluidized beds thus are characterized by great uniformity of temperature, of particle concentration, etc., due to the mobility of the particles. Moreover, they offer the advantage of permitting high levels of mass or energy transfer since the collisions of the particles with one another are continually destroying the boundary layer which surrounds the particle and which interferes with heat transfer, with the result that heat and mass transfer between gas and solid is very rapid in a fluidized bed. Furthermore, regulation of the flow rate of the solid particles is readily accomplished, resulting in ease of control of the reaction in which the solid material takes part, either as a starting material or as a catalyst.

It is, of course, necessary to be able to take samples in order to monitor the characteristics of the particles of the fluidized bed either continuously or at regular intervals since they are generally friable and therefore prone to erode, and since by-products may deposit on their surface and alter their properties, particularly when they serve as a catalyst. Similarly, it may prove necessary to replace a portion of the suspended particles either continuously or at regular intervals, and consequently to discharge them from the fluidized-bed enclosure.

To this end, the most commonly used and simplest procedure is to take advantage of the properties of a fluidized bed which make it resemble a liquid by providing for sampling by means of a riser pipe branching off from the enclosure of the fluidized bed and equipped with a valve which is opened and then closed upon each sampling, the suspension of particles being forced into the pipe by the static pressure exerted on the wall. When this valve, located below the upper surface of the fluidized bed, is open, the particles tend to flow into the pipe and can thus be sampled. However, the valve wears out very quickly because its parts are in constant contact with the highly abrasive particles in random motion.

The present invention seeks to overcome this drawback by proposing a system for the continuous or discontinuous sampling in an enclosure of solid particles in a fluidized bed which permits the flow rate of the particles in the sampling pipe to be precisely controlled, in principle without the use of a valve that is constantly in contact with the particles of the fluidized bed.

To this end, the invention has as an embodiment a system for the sampling in an enclosure of solid particles in a fluidized bed, said system comprising a sampling riser pipe which communicates by its lower end with the enclosure below the upper surface of the fluidized bed and forms an extension of the fluidized bed of particles, said system being characterized in that the pipe comprises a restriction adapted to limit the sampling flow rate, and in that means are provided for injecting a compressed gas at an adjustable flow rate into the pipe between the enclosure and the restriction with a view to permitting precise control of the flow rate of withdrawal from the fluidized bed.

In particular, with a sufficiently high flow rate of gas, allowing for the characteristics of the restriction in the pipe, the gas under pressure will force the particles of the fluidized bed back into the enclosure, thus permitting sampling to be interrupted.

The restriction may consist of a simple orifice or of a reduced-diameter pipe section, or optionally of a partly open valve whose upper portion, preferably disposed below the upper surface of the fluidized bed, may advantageously terminate in an overflow toward a conventional drawoff or storage system.

When the rate of injection of the gas into the sampling pipe is increased, the withdrawal of particles from the fluidized bed is reduced. Conversely, to increase such withdrawal, it is only necessary to reduce the flow rate of the injected gas. Thus a simple means which does not involve the use of a valve that is directly and constantly in contact with the abrasive particles is available for the continual regulation of the sampling of the particles of a fluidized bed.

The diameter of the restriction will depend on the desired maximum rate of withdrawal. In most cases, the diameter of the restriction will be from about 0.01 to 0.5 times the diameter of the sampling riser pipe.

The gas injected into the pipe is preferably the same as the fluidizing gas. However, depending on the circumstances, it may be any other gas that is compatible with the object to be accomplished.

Control of the rate of injection of the gas can thus be effected in various ways: By regulation of the control gas, through the size of the restriction (orifice, pipe section or valve) in the riser pipe, or by regulation of the pressure in the storage container.

Moreover, the range of flow rates of particle withdrawal can readily be modified to meet sampling requirements by replacing the reduced-diameter pipe section with another pipe section of appropriate diameter, or by placing several pipe sections, each provided with a valve, in parallel directly in the riser pipe, or by opening the restriction valve to a greater or lesser extent.

If desired, the sampling pipe may comprise one or more safety valves upstream or downstream of the restriction. These, however, will wear at a much slower rate than those used in present-day sampling systems because they will only serve as safety valves.

Such a system will be particularly well suited for the sampling in continuous or semicontinuous operation of spent catalyst particles in the regenerator of a unit for the catalytic cracking of hydrocarbons.

It is known, in fact, that the petroleum industry routinely employs cracking processes in which hydrocarbon molecules of high molecular weights and high boiling points are broken down into smaller molecules that will boil in lower temperature ranges suitable for the desired purpose.

The process which at present is most widely used to this end is the so-called Fluid Catalytic Cracking, or FCC, process. In this type of process, the hydrocarbon feedstock is vaporized and contacted at high temperature with a cracking catalyst that is maintained in suspension in the vapors of the feedstock. After the desired range of molecular weights has been obtained by cracking, with a corresponding lowering of the boiling points, the catalyst is separated from the products obtained, stripped, regenerated by burning off the coke formed, and then again contacted with the feedstock to be cracked.

The catalyst usually consists of alumina particles whose average diameter generally ranges from 40 to 90 microns and on which various metals have been deposited.

In the regenerator, air is used to fluidize these particles and to burn off the coke deposited thereon. The temperature of combustion may range from 600° to 900° C., and the flow rate of the air injected is of the order of 0.1 to 1.0 tons/hour/square meter of diffuser surface.

It is important to be able to monitor the conditions of regeneration of the catalyst, and the sampling system forming the object of the present invention lends itself particularly well to such use, employing compressed air, for example, as the gas injected into the sampling riser pipe.

Similarly, this system may be used to carry out sampling in fluid-bed reforming reactors and in fluid-bed hydrotreating reactors.

All these uses of the sampling system in accordance with the invention fall within the scope of the invention. The control of such sampling, by modulation of the flow of air injected into the sampling riser pipe, in particular can be automated and subjected to various control means for other parameters.

The single FIGURE of the accompanying diagrammatic drawing illustrates a preferred embodiment of the sampling system of the invention.

In the drawing, 1 designates the enclosure in which a suspension of solid particles in the gas phase, or fluidized bed L, is maintained. At the bottom of the enclosure, a diffuser 2 supplied with a compressed gas such as air through a line 3 injects it at a sufficiently high rate to produce a boiling fluidized bed. A sampling riser pipe 4, which here extends at an angle of about 45 degrees to the enclosure 1, opens into the latter below the upper surface Z of the fluidized bed. The pipe 4 comprises a restriction, which here consists of a reduced-diameter pipe section 5, adapted to limit the sampling flow to a rate below a predetermined threshold.

Because of the position of the pipe 4 below the upper surface of the fluidized bed, the particles of the fluidized bed are forced into the pipe 4 by pressure and entrained by the gas stream coming from the fluidized bed. They therefore tend to flow into the overflow 6, with which the pipe section 5 communicates through a T union, for example. The overflow 6 in turn communicates with a discharge pipe 7, which conducts the particles withdrawn to a pressurized tank 8 that permits the required quantity of sample to be stored. The conditions for fluidization are not all present in the tank 8, and the latter therefore holds what is actually a dense bed unless a diffuser 9 is disposed at its bottom and supplied with gas through a line 10 to permit the particles to be maintained in motion, and possibly to drive out the gases.

In the figure, the pressurized tank 8 communicates through a valve 11 with a detachable receptacle 12 for the particles withdrawn, or conventionally with any suitable pneumatic conveying system.

A safety valve 13 is provided in the pipe 4 between the enclosure 1 and a line 14 through which a compressed gas such as air is piped at a rate that is adjustable by means of a valve 15. That flow rate may be adjusted in particular to maintain the temperature in the sampling line at a predetermined level, or to regulate the level of the fluidized bed through the withdrawal of catalyst.

The pipe 4 communicates freely with the enclosure 1, and the particles of the fluidized bed will be conveyed in this pipe by the gas which keeps them in suspension. As pointed out above, the pressure drop due to pipe section 5 permits the sampling rate to be limited to a predetermined maximum when the withdrawal of particles is continuous. By adjusting the flow rate of the compressed gas injected through line 14, or by manipulating the pressure in tank 8 through line 16, it is further possible to regulate the sampling rate with precision below that maximum, or even to carry out sampling discontinuously by stopping withdrawal when the air injected through valve 15 exceeds the flow rate allowed by the restriction. The catalyst in the fluidized bed then is unable to enter the sampling pipe and therefore is forced back into the fluidized bed.

We claim:

1. An apparatus for sampling particles from an enclosure adapted to contain at at least a given level a fluidized bed of solid particles, comprising a sampling riser pipe external to the enclosure and communicating by its lower end with the enclosure below the given level so as to form an extension of any fluidized bed contained therein, a restriction in said sampling riser pipe adapted to limit the sampling flow rate, and means for injecting a compressed gas at an adjustable flow rate into the sampling riser pipe between the enclosure and the restriction for controlling, by appropriate regulation of the flow rate of the gas, the quantity of particles withdrawn.

2. The apparatus as defined in claim 1, wherein the restriction comprises a reduced-diameter pipe section.

3. The apparatus as defined in claim 2, wherein the diameter of the restriction is from 0.01 to 0.5 times the diameter of the sampling riser pipe.

4. The apparatus as defined in claim 1, wherein the restriction adapted to limit the sampling flow rate is selected from the group consisting of a simple orifice, at least one pipe section, and a simple valve.

5. The apparatus as defined in claim 1, further comprising an overflow located below the given level in communication with the sampling riser pipe beyond said restriction.

6. The apparatus as defined in claim 5, further comprising a storage means in communication with said overflow 7. A method for sampling particles from a zone defined by a fluidized bed of solid particles suspended by a fluidizing gas, comprising:

forming an upwardly-extending passage external to said zone, the inlet of which communicates by its lower end with said zone below the level at which the upper surface of said fluidized bed would form, restricting the outlet of said passage, injecting a compressed gas at an adjustable flow rate into said passage at a point prior to the restricting of the outlet, controlling, by appropriate regulation of the flow rate of the compressed gas, the quantity of particles withdrawn from said fluidized bed and permitted into said passage, and collecting said particles from said passage.

8. The method as defined in claim 7 wherein the compressed gas injected into the passage is the same as the fluidizing gas.

9. The method as defined in claim 7, wherein the quantity of particles withdrawn from the fluidized bed is reduced by increasing the flow rate of the injected gas.

10. A method for monitoring the regeneration of catalyst particles in a regenerator of a fluid-bed catalytic cracking unit comprising sampling said catalyst particles with the apparatus of claim 1 and testing them for regeneration.

11. A method for monitoring the condition of catalyst particles in a continuous fluid-bed catalytic reforming unit or in a fluid bed hydrocarbon hydrotreating unit comprising sampling said catalyst particles with the apparatus of claim 1 and testing them for erosion, by-product deposition and character alterations.

* * * * *